United States Patent Office 2,914,564
Patented Nov. 24, 1959

2,914,564

AMINE DERIVATIVES OF 1,1,2-TRIPHENYL-ETHANE

Robert E. Allen, Wyoming, and Frank P. Palopoli and Edward L. Schumann, Cincinnati, Ohio, and Marcus G. Van Campen, Jr., Berkeley, Calif., assignors to The Wm. S. Merrell Company No Drawing. Application August 6, 1957
Serial No. 676,494

3 Claims. (Cl. 260—570)

Our invention relates to new chemical compounds which may be regarded as derivatives of triphenylethane. They are distinguished, in general, by their anti-estrogenic activity in the endocrine system, anti-inflammatory activity, gonadotrophic activity and activity in decreasing blood cholesterol levels. Some of the compounds possess various combinations of these properties.

As estrogen antagonists, the compounds are useful in the treatment of hyperestrogenism and disorders related to this condition, e.g., endometriosis, functional bleeding, Kleinfelter's syndrome, dysmenorrhea, menopausal dysfunction, and similar conditions. They are active both orally and parenterally and so can be administered by either route, though the oral route is preferred in most instances. Some of the compounds have a high degree of activity as estrogen antagonists. Some of the compounds with anti-estrogenic activity are also uterotrophic.

As anti-inflammatory agents, the compounds are useful in alleviating the symptoms of such collagen diseases as arthritis and rheumatism and in the topical treatment of inflammation. Some of the compounds possess the novel combination of anti-inflammatory and anti-estrogenic activities and are especially advantageous for this reason.

As blood cholesterol depressants, the compounds are useful in the treatment of atherosclerosis.

As gonadotrophic inhibition agents, the compounds are useful for the treatment of fertility and sterility problems and can be administered orally or parenterally for this purpose.

The compounds can be used orally and parenterally in doses ranging between 25 mg. and 2–4 grams daily, depending on the condition under treatment. For topical use, the compounds can be incorporated into creams, ointments or lotions in concentrations of up to 10 percent. In aerosol sprays, the concentration can be in the order of about 0.05 to 1 percent.

The ethanes can be isolated and are generally useful in the form of their salts with mineral acids, such as hydrochloric or hydrobromic aciid or with organic acids such as citric, oxalic or the like. They can be used as the base, however.

The compounds of our invention are derivatives of triphenylethanes in which one of the phenyl groups is substituted by a basic ether group of the formula described below and in which the mono-phenyl substituted carbon atom in the ethane group is linked to two hydrogen atoms. The new compounds have the formula

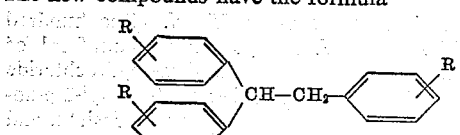

in which one of the groups represented by R is a basic ether group of the formula $-OC_nH_{2n}A$, wherein $n$ is 2, 3 or 4 and A is a dialkylamino group in which the alkyl group contains from 1 to 4 carbon atoms. The group $-OC_nH_{2n}A$ is attached to a benzene ring by the oxygen atom in the para position to the point of attachment of the benzene ring to the ethane group. The remaining R groups are hydrogen, halogen or methoxy, provided, however, that at least one of the remaining groups is halogen or methoxy.

The new ethanes in which the $-OC_nH_{2n}A$ group is attached to the benzene ring attached to the ethane carbon atom bearing two hydrogens can be prepared by reacting a 1,1-diaryl-2-hydroxyphenyl-ethane with a dialkylaminoalkyl halide.

The new ethanes in which the $-OC_nH_{2n}A$ group is attached to a benzene ring attached to the ethane carbon atom carrying a second benzene nucleus can be generally prepared by hydrogenation of the corresponding ethylenes of the formula

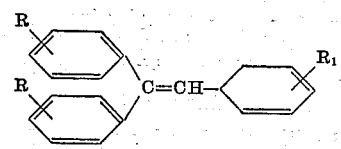

wherein the R substituents have the same meaning described above and $R_1$ is hydrogen, halogen or methoxy. The ethylenes are described in our applications Serial No. 620,570, filed November 11, 1956, and now abandoned, and Serial No. 676,477, filed August 6, 1957.

The ethylenes are prepared by dehydration of the corresponding ethanols of the formula

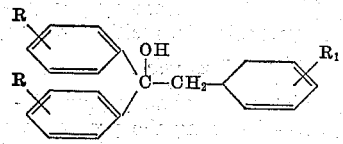

wherein the R and $R_1$ substituents have the same meaning as in the ethylenes above. The dehydration is carried out by the use of mineral acids such as hydrochloric, hydrobromic or phosphoric acids. The ethanols are described in our application Serial No. 599,343, filed July 23, 1956, and now abandoned and Serial No. 676,478, filed August 6, 1957.

The compounds of our invention will be further illustrated by the following examples.

Example 1

1 - [p - (β - dimethylaminoethoxy)phenyl] - 1 - phenyl-2-p-anisylethane.—A solution of 39 g. of 1-[p-(β-dimethylaminoethoxy)phenyl] - 1 - phenyl - 2 - p - anisylethylene hydrochloride in 200 cc. of ethanol was hydrogenated using 3 g. of 10 percent palladium on charcoal as catalyst at 50° C. and 50 pounds hydrogen pressure. After the theoretical amount of hydrogen was consumed, the catalyst was removed by filtration, the ethanol was replaced by isopropanol from which 1-[p-(β-dimethylaminoethoxy)phenyl] - 1 - phenyl - 2 - p - anisylethane hydrochloride separated, melting at 188–190° C.

This compound is weakly estrogenic and exhibits gonadotrophic inhibitory and anti-inflammatory activities and activity in decreasing blood cholesterol levels.

Example 2

1 - [p - (β - diethylaminoethoxy)phenyl] - 1 - phenyl - 2-p-anisylethane.—Twenty grams of 1 - [p-(β-diethylaminoethoxy)phenyl]-1-phenyl-2-p-anisylethanol was refluxed 4 hours in ethanol containing an excess of hydrogen chloride. The mixture was rendered basic with 10 percent sodium hydroxide, extracted with ether, the ether was replaced with 200 cc. of ethanol, and the free base was hydrogenated as described in Example 1. After the catalyst was removed, the solution was acidified with alcoholic hydrogen chloride, and the solvent was replaced with isopropanol and ethyl acetate, from which separated 1 - [p - (β - diethylaminoethoxy)phenyl] - 1 - phenyl - 2-p-anisylethane hydrochloride, melting at 114–118° C.

This compound exhibits on-estrogenic uterotrophic estrogen antagonist and anti-inflammatory activities and activity in decreasing blood cholesterol levels.

*Example 3*

*1,1 - di - p - anisyl - 2 - [p - (β - diethylaminoethoxy)-phenyl]-ethane.*—A mixture of 8.1 g. of 1,1-di-p-anisyl-2-p-hydroxyphenylethane and 1.32 g. of sodium methoxide in 45 cc. ethanol was refluxed 20 minutes. A solution of β-diethylaminoethyl chloride (3.3 g.) in 6.6 cc. of xylene was added and the mixture was refluxed 3 hours. Benzene was added and the mixture was washed with 10 percent sodium hydroxide and then water, and dried over anhydrous potassium carbonate. The solvent was replaced with ether, the solution was rendered acidic with alcoholic hydrogen chloride, and the precipitate was recrystallized from ethyl acetate to give 1,1-di-p-anisyl - 2 - [p - (β - diethylaminoethoxy)phenyl] - ethane hydrochloride, melting at 125–128° C.

This compound exhibits anti-inflammatory activity.

*Example 4*

*1 - [p - (β - dibutylaminoethoxy)phenyl] - 1 - phenyl - 2-p-anisylethane.*—Fifteen grams of 1 - [p-(β-dibutylaminoethoxy)phenyl] - 1 - phenyl - 2 - p - anisylethylene hydrochloride in 200 cc. ethanol was hydrogenated at room temperature and at an initial 50 pounds pressure, using 0.3 g. platinum oxide catalyst. After the catalyst and solvent were removed, the residue was dissolved in ethyl acetate and ether from which was obtained 1 - [p-(β-dibutylaminoethoxy)phenyl]-1-phenyl-2-p-anisylethane hydrochloride, melting at 105° C.

*Example 5*

*1 - [p - (γ - diethylaminobutoxy)phenyl] - 1 - phenyl - 2-p-anisylethane.*—Following the procedure of Example 2, 14.2 g. of 1 - [p - (γ-diethylaminobutoxy)phenyl]-1-phenyl-2-p-anisylethanol was dehydrated with excess alcoholic hydrogen chloride and without isolating the free base, the hydrochloride salt was hydrogenated, using 0.3 g. platinum oxide catalyst. The salt was converted to the free base, dissolved in butanone and a solution of 6.15 g. of citric acid in 25 cc. ethanol was added. The product, crystallized from butanone, was the dihydrogen citrate salt of 1-[p-(γ-diethylaminobutoxy)phenyl]-1-phenyl-2-p-anisylethane, melting with decomposition at 88–90° C.

This compound exhibits uterotrophic estrogen antagonist and anti-inflammatory activities.

*Example 6*

*1 - [p - (β- diethylaminoethoxy)phenyl] - 1 - p - chlorophenyl-2-p-anisylethane.*—Following the procedure of Example 5, 26 g. of 1-[p-(β-diethylaminoethoxy)phenyl]-1-p-chlorophenyl-2-p-anisylethanol was dehydrated and the hydrochloride salt was hydrogenated. 1-[p-(β-diethylaminoethoxy)phenyl] - 1 - p - chlorophenyl - 2 - p - anisylethane was obtained, whose dihydrogen citrate salt melted with decomposition at 130° C.

This compound exhibits uterotrophic, gonadotrophic inhibitory and anti-inflammatory activities and activity in decreasing blood cholesterol levels.

*Example 7*

*1 - [p - (β - diethylaminoethoxy)phenyl] - 1 - phenyl - 2-(p-fluorophenyl)ethane.*—Following the procedure of Example 5, 14 g. of 1-[p-(β-diethylaminoethoxy)phenyl]-1-phenyl-2-(p-fluorophenyl)ethanol was dehydrated and the hydrochloride salt was hydrogenated. 1-[p-(β-diethylaminoethoxy)phenyl] - 1 - phenyl - 2 - (p - fluorophenyl)ethane was obtained, whose dihydrogen citrate salt melted at 108–110° C.

This compound has anti-inflammatory activity.

All of the compounds of the above example exhibited the activities described for each when administered parenterally (subcutaneously). Also, the compounds of Example 3 exhibited anti-inflammatory activity when administered orally.

The following examples illustrate suitable pharmaceutical compositions containing the new compounds. In these examples, the quantities are given for single units, it being understood that in actual practice, and the amounts of materials used adjusted accordingly.

*Example 8*

*25 mg. tablets.*—Twenty-five mg. of the hydrochloride of 1 - [p - (β - diethylaminoethoxy)phenyl] - 1 - phenyl-2-p-anisylethane (Example 2), 48 mg. of powdered sugar, and 32 mg. of corn starch are mixed and granulated with 10 percent gelatin solution. The granulation is dried and ground to fine granules for tableting. About 1 percent magnesium stearate is added as a lubricant, together with sufficient corn starch to give a weight of 2.5 grains per tablet. The product is compressed on a single punch or rotary machine using a 9/32 inch punch.

*Example 9*

*500 mg. tablets.*—Five hundred mg. of the hydrochloride of 1-[p-(β-diethylaminoethoxy)phenyl]-1-phenyl-2-p-anisylethane (Example 2) in finely powdered form is admixed with 60 mg. of corn starch and 100 mg. of powdered sugar and then granulated with 10 percent gelatin solution. The granulation is dried and ground to size suitable for tableting. About 1 percent magnesium stearate is added as a lubricant, together with sufficient corn starch to give a weight of 700 mg. per tablet. The product is compressed on a single punch or rotary machine using a 7/16 inch punch.

The tablets of Example 9 and Example 9 may be suitably coated if desired, as, for example, with sugar.

*Example 10*

*Capsule.*—Twenty-five mg. of the hydrochloride of 1-[p - (β - dimethylaminoethoxy)phenyl] - 1 - phenyl - 2 - anisylethane (Example 1) is admixed with corn starch in quantity required to provide sufficient bulk for the desired size capsule, and the mixture is encapsulated.

*Example 11*

*Capsule.*—Five hundred mg. of the hydrochloride of 1-[p-(β-dimethylaminoethoxy)phenyl]-1-phenyl-2-p - anisylethane (Example 1) is admixed with sufficient corn starch to give the proper bulk for the desired size capsule, and the mixture is encapsulated.

*Example 12*

*Injectable suspension, 100 mg. per ml.*—The following ingredients are sterilized separately: 100 mg. of the citrate of 1-[p-(β-diethylaminoethoxy)-phenyl] - 1 - p - chlorophenyl-2-p-anisylethane (Example 6), 0.1 mg. of tween 80 and q.s. corn oil to make a final volume of one ml. These ingredients are admixed aseptically. Particle size may be achieved by use of micronized material or by use of a ball mill, maintaining aseptic conditions. The above suspension may be administered subcutaneously and intramuscularly.

*Example 13*

*Oral suspension, 700 mg. per 15 ml.*—One hundred fifty mg. of Veegum H. V. are hydrated in about 9 ml. of water; 500 mg. of tween 80, 700 mg. of the hydrochloride of 1-[p-(β-diethylaminoethoxy)phenyl]-1-phenyl-2-p-anisylethane (Example 2), color and flavor, as desired, and water q.s. 15 ml. are added; the product is mixed well and homogenized.

*Example 14*

*Liquid (syrup) 25 mg. per teaspoon.*—Twenty-five mg.

of the citrate of 1-[p-(β-diethylaminoethoxy)phenyl]-1-p-chlorophenyl-2-p-anisylethane (Example 6) is dissolved in one ml. of water. Five mg. of sodium benzoate, 3.5 ml. of liquid sugar, 5 mg. of citric acid, and 0.375 mg. of butoben are added and stirred until dissolved, using gentle heat if necessary. Flavor, as desired, and water q.s. are then added.

*Example 15*

*Liquid (syrup) 500 mg. per tablespoon.*—Five hundred mg. of the citrate of 1-[p-(β-diethylaminoethoxy)phenyl]-1-p-chlorophenyl-p-anisylethane (Example 6) and 4.5 mg. of sugar are dissolved in sufficient water so that after the addition of 2.25 ml. of alcohol USP and flavor, as desired, the volume is 15 ml.

*Example 16*

*Injectable solution, 2 mg. per ml.*—Two mg. of the citrate of 1-[p-(β-diethylaminoethoxy)phenyl]-1-p-chlorophenyl-2-p-anisylethane (Example 6) and water for injection q.s. one ml. are mixed and warmed gently till solution is accomplished. The solution is filtered through fine sintered glass, filled into sterile one ml. ampuls, and sterilized at 250° F. for 30 minutes.

*Example 17*

*1% ointment.*—To a melt of 1.5 lbs. of propylene glycol 6.68 lbs. of polyethylene glycol 400 USP and 6.68 lbs. of carbowax 4000 USP is added 0.15 lbs. of micropulverized hydrochloride of 1-[p-(β-dimethylaminoethoxy)phenyl]-1-phenyl-2-p-anisylethane (Example 1). The product is stirred until almost solid and milled if necessary to a smooth ointment. Fill in suitable containers.

*Example 18*

*10% ointment.*—To a melt of 1.5 lbs. of propylene glycol, 6 lbs. of polyethylene glycol 400 USP and 6 lbs. carbowax 4000 USP is added 1.5 lbs. of micropulverized hydrochloride of 1-[p-(β-dimethylaminoethoxy)phenyl]-1-phenyl-2-p-anisylethane (Example 1). The product is stirred until almost solid and milled if necessary to a smooth ointment. Fill in suitable containers.

The other compounds of Examples 1 to 7 can also be used to prepare pharmaceutical preparations such as those of Examples 8 to 18.

We claim:
1. Compounds of the formula

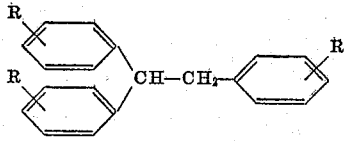

wherein one of the groups represented by R is a group of the formula —$OC_nH_{2n}A$, attached by the oxygen atom to the benzene ring in the para position to the point of attachment of the benzene ring to the carbon atom of the straight chain group, wherein $n$ is an integer of 2 to 4 and A is dialkylamino group in which the alkyl groups contain from 1 to 4 carbon atoms, and wherein the remaining R groups are selected from the group consisting of hydrogen, halogen and methoxy, at least one of the remaining R groups is selected from halogen and methoxy.

2. 1-[p-(β-diethylaminoethoxy)phenyl]-1-phenyl-2-p-anisylethane.

3. 1,1-di-p-anisyl-2-[p-(β-diethylaminoethoxy)phenyl]ethane.

References Cited in the file of this patent

UNITED STATES PATENTS

| | | |
|---|---|---|
| 2,430,891 | Shelton et al. | Nov. 18, 1947 |
| 2,571,954 | Shelton et al. | Oct. 16, 1957 |

FOREIGN PATENTS

| | | |
|---|---|---|
| 586,493 | Great Britain | Mar. 20, 1957 |

OTHER REFERENCES

Karaulova: Chemical Abstracts, vol. 49, p. 976h (1955); as abstracted from Doklady Akademie Nauk U.S.S.R. 92, pp. 315–317 (1953).